United States Patent [19]

Bakx

[11] Patent Number: 5,226,027
[45] Date of Patent: Jul. 6, 1993

[54] RECORDING METHOD AND DEVICE WHICH PROVIDES AN OPTIMUM SETTING OF A RECORD-CARRIER-DEPENDENT RECORDING PARAMETER

[75] Inventor: Johannes L. Bakx, Eindhoven, Netherlands

[73] Assignee: U.S. Philips Corporation, New York, N.Y.

[21] Appl. No.: 542,220

[22] Filed: Jun. 21, 1990

[30] Foreign Application Priority Data

Feb. 12, 1989 [NL] Netherlands ............ 9000328
Jun. 23, 1989 [NL] Netherlands ............ 8901591

[51] Int. Cl.$^5$ .................................. G11B 7/00
[52] U.S. Cl. ...................... 369/58; 369/48; 369/116; 369/54
[58] Field of Search ............ 369/116, 54, 58, 48, 369/116, 44.27, 44.29, 44.31, 44.39, 50, 109, 44.26; 360/27, 48

[56] References Cited

U.S. PATENT DOCUMENTS

| | | | |
|---|---|---|---|
| 4,189,746 | 2/1980 | Valachovic | 369/109 X |
| 4,578,786 | 3/1986 | McIntosh et al. | 369/44.26 X |
| 4,631,713 | 12/1986 | Romas et al. | 369/116 |
| 4,912,697 | 3/1990 | Enari et al. | 369/116 |
| 4,916,683 | 4/1990 | Mizokami et al. | 369/54 |

FOREIGN PATENT DOCUMENTS 0241934 10/1987 European Pat. Off.
58-185066 10/1983 Japan.
62-248174 10/1987 Japan.

OTHER PUBLICATIONS

International Application (PCT); publication No. WO 87/01856; Mar. 26, 1987; Painton et al.

Primary Examiner—Aristotelis Psitos
Assistant Examiner—P. W. Huber
Attorney, Agent, or Firm—Leroy Eason

[57] ABSTRACT

A recording method and corresponding recording apparatus adjusts at least one record carrier-dependent recording parameter ($I_s$) which influences the quality of the recorded information pattern (58, 59). In determining an optimum setting of the parameter ($I_s$) a calibration area (21) is selected from a predetermined number of such areas on the record carrier. The selected area is then provided with test patterns recorded at different settings of the recording parameter, and based on the test patterns thus formed an optimum setting of such parameter is determined in accordance with a predetermined criterion. The parameter is adjusted in accordance with such optimum setting thereof during the recording of the information pattern (58, 59). Each time such a calibration is performed an auxiliary pattern is recorded in an auxiliary area (22) assigned to the calibration area employed, which auxiliary pattern indicates that test patterns are present in such calibration area. For making a subsequent calibration, the calibration area to be used is selected on the basis on which of the auxiliary area (22a, ..., 22d) already include auxiliary patterns.

8 Claims, 7 Drawing Sheets

RECORDING METHOD AND DEVICE WHICH PROVIDES AN OPTIMUM SETTING OF A RECORD-CARRIER-DEPENDENT RECORDING PARAMETER

BACKGROUND OF THE INVENTION

1. Related Application

This application is related to Applicant's copending application Ser. No. 07/491,399, filed mar. 8, 1990, and also to his application Ser. No. 07/542,287, filed concurrently herewith, since issued as U.S. Pat. No. 5,072,435, dated Dec. 10, 1991, and his application Ser. No. 453,547, filed Dec. 20, 1989, since issued as U.S. Pat. No. 5,105,413, date Apr. 14, 1992. All are assigned to the present assignee, and pertain, inter alia, to adjustment of a recording parameter of an information recording device.

2. Field of the Invention

The present invention relates to a method of recording information patterns on a record carrier, in which method at least one record-carrier-dependent recording parameter which influences the quality of the recorded information pattern is adjusted to an optimum value of such parameter.

The invention further relates to an information recording device comprising write means for writing an information pattern on a record carrier and means for adjusting a record carrier-dependent-recording parameter of the write means to an optimum value of such parameter.

This type of method and such a device are generally known, inter alia from European Patent Document EP-A-O,288,114. The method and the device described therein employ record carriers which have been provided with adjustment data, specifically the write signal waveform and write intensity, during fabrication of the record carriers. After insertion of the record carrier into the information recording device, the adjustment data is read from the record carrier and the write means are adjusted in conformity with the adjustment data thus read. However, the drawback of the prior-art device is that the resulting adjustment of the write means is not always found to be optimum for the combination of the particular recording device and record carrier which are employed. As a result of this, the dimensions of the recorded information patterns may exhibit deviations, so that the recorded information cannot always be read reliably.

SUMMARY OF THE INVENTION

It is an object of the present invention to provide a device of the described type, in which the adjustment of a write parameter of the write means is improved. With respect to the method, this object is achieved by selecting a calibration area from a number of possible predetermined calibration areas on the record carrier, forming test patterns in the selected calibration area for different settings of the parameter, determining the optimum setting of such parameter in accordance with a predetermined criterion on the basis of the test patterns thus formed, and adjusting the parameter in conformity with said optimum setting during the formation of the information patterns on the second carrier.

Apparatus according to the invention comprises selection means for selecting a calibration area from a number of predetermined calibration areas on the record carrier, means for causing test patterns to be formed in the selected calibration area for different settings of a write parameter of the write means, means for selecting an optimum setting of such parameter on the basis of the test patterns thus formed, and means for adjusting the write parameter in conformity with the selected optimum setting during the formation of information patterns on the record carrier.

The invention is based inter alia on Applicant's recognition of the fact that the optimum setting of the write parameter of the write means strongly depends not only on the record carrier used but also on the information recording device used. For a specific combination of a record carrier and a recording device, however, the optimum setting is found to remain substantially constant for the entire recording area of the record carrier.

Therefore, the determination of the write adjustment data in a device in accordance with the invention may be considered to be optimum for the entire recording area of the record carrier. The use of a number of different calibration areas moreover enables the optimum setting to be determined several times, for example each time that the record carrier is loaded into a recording device. This is an advantage particularly when the same record carrier of a type which cannot be overwritten is used in a number of different information recording devices. The use of a plurality of calibration areas then also enables the optimum setting to be determined for each information recording device. In principle, the calibration area to be used can be selected by detecting which of the calibration areas have already been provided with test patterns. A drawback of this is that many of the test patterns are formed while the setting is not optimum, so that a reliable detection of the presence of the test patterns cannot be guaranteed. Moreover, the search for an unused calibration area may require considerable time owing to the total length of the calibration areas.

If a table of contents is available which specifies how many information signals have already been recorded on the record carrier, the maximum number of calibration areas used can be derived from the contents of this table, assuming that the optimum setting was determined only once for recording each information signal. An unambiguous selection of a calibration area is then always possible on the basis of this number. The last-mentioned selection method has the drawback that once an optimum setting has been determined, it is not permissible to delay in recording the next information signal. This means that the process of determining the optimum setting must be postponed until it is absolutely certain that a signal is about to be recorded. This may lead to additional delays in the recording of further information signals.

The drawbacks of the above selection methods are avoided by assigning an auxiliary area to each calibration area, an auxiliary pattern being formed, each time that an optimum setting is determined, in the auxiliary area assigned to the calibration area used for determining the optimum setting, a new calibration area being selected on the basis of the auxiliary patterns recorded in the auxiliary areas.

The use of an auxiliary area makes it always possible to determine unambiguously which calibration areas have already been used. As the dimensions of the auxiliary areas can be substantially smaller than the dimensions of the calibration areas, selection of an unused calibration area can be made far more rapidly on the basis of the auxiliary areas than on the basis of the calibration areas themselves.

If a record carrier is used which has already been provided with address information for the purpose of locating the calibration areas, it is advantageous if the calibration area used directly follows an area not already provided with test patterns. This is because when the test patterns are formed the address information may be damaged to such an extent that a correct reading of the address information is no longer guaranteed, and locating an area which is situated a short distance after an area with damaged address information may then give rise to problems. When record carriers are used whose calibration areas form part of a preformed servo track, applying the test patterns may cause the track to be damaged to such an extent that a correct tracking cannot be guaranteed.

Preferably, the number of calibration areas is selected to be larger than or equal to the maximum number of information signals which can be recorded on a record carrier. (This number is one hundred for recording CD signals.) This guarantees that a calibration area for determining the adjustment is available for each information signal to be recorded.

BRIEF DESCRIPTION OF THE DRAWINGS

Further illustrative embodiments and their advantages will now be described in detail with reference to FIGS. 1 to 10, in which FIGS. 1 and 4 provide illustrative embodiments of the device in accordance with the invention.

DETAILED DESCRIPTION OF THE PREFERRED EMBODIMENT

Figure 1:
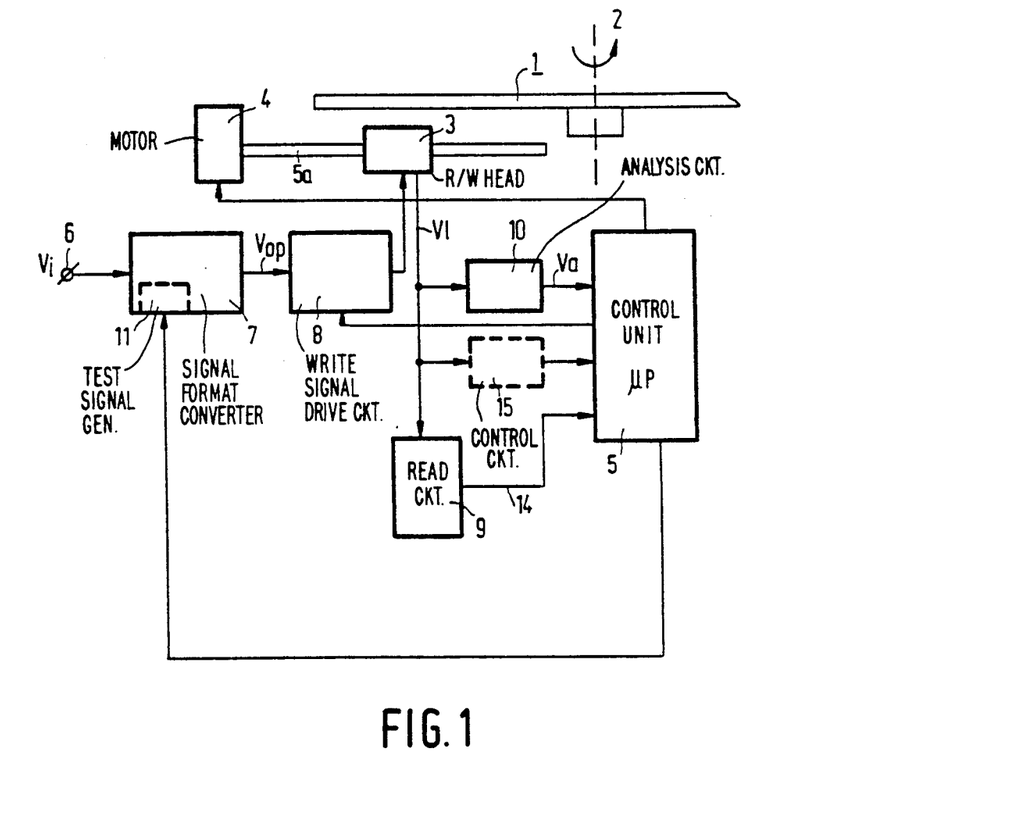

FIG. 1 shows an illustrative embodiment of an information recording device in accordance with the invention by means of which information can be recorded on a record carrier 1, for example an optical record carrier, which is rotated about an axis 2. The information recording device comprises a conventional read/write head 3, arranged opposite the rotating record carrier. By means of a customary positioning system, for example, in the form of a motor 4 and a spindle 5a, the read-write head 3 can be moved in a radial direction relative to the record carrier 1 under control of a customary control unit 5, which may take the form of a microprocessor.

An information signal Vi to be recorded can be applied to a signal processing circuit 7 via an input 6. The signal processing circuit 7 is of a conventional type, which converts the applied input signal into a recording signal Vop of a suitable recording format, for example CD format or RDAT-format. The recording signal Vop is applied to a driver circuit 8 of a customary type, which converts the recording signal Vop into a write signal Vs for the read/write head 3 in such a way that an information pattern corresponding to the recording signal Vop is recorded on the record carrier. For the purpose of reading the recorded information patterns, the read/write head 3 has an output for supplying a read signal V1 which is representative of the information pattern being read. The read signal V1 is applied to a read circuit 9 for recovering the information represented by the read signal V1. The driver circuit 8 is of an adjustable type, enabling one or more of the parameters which influence the quality of the recorded information pattern to be adjusted. When an optical read/write head is used, by which an information pattern of optically detectable effects is formed by means of a radiation beam, the intensity of the radiation beam is an important adjustment parameter which largely determines the quality of the recorded information pattern. If the read/write head is a magnetic or magneto-optical write head which generates a magnetic field for the purpose of forming an information pattern in the form of a magnetic effects (domains), the field strength of the generated magnetic field may be an important adjustment parameter. If the information pattern is formed by means of write pulses, the pulse width may be an important adjustment parameter. It is to be noted that the above-mentioned adjustment parameters are only few examples of the large number of adjustment parameters which are possible. In this respect reference may be made in particular to Dutch Patent Document NL-A-9000150, in which the adjustment parameter is a reference value for the speed with which the recording effects are formed on the record carrier. During the formation of such effects the intensity of the write beam is controlled to maintain the speed with which the effects are formed at the adjusted reference value.

For determining the optimum setting of the write signal driver circuit 8 the device comprises an analysis circuit 10, which derives from the read signal an analysis signal Va which is indicative of the quality of the information pattern being read. The optimum setting of the write parameter can be determined in a calibration procedure by forming test information patterns on record carriers for different settings of the write signal driver circuit 8, and by selecting, on the basis of the analysis signal Va obtained from the recorded patterns, the setting of the write signal driver circuit 18 for which the analysis signal indicates a recorded pattern of optimum quality. In principle, the information signal Vi may itself be employed for writing the test information patterns. However, it is also possible to employ a test signal generator 11 for this purpose, which may then be included, for example, in the signal processing circuit 7. The optimum setting is determined under control of the control unit 5, which for this purpose is coupled to the analysis circuit 10, to the driver circuit 8, and to the test signal generator 11, if present. The control unit 5 is loaded with a suitable program or may comprise a suitable hardwired control circuit 15. Preferably, the optimum setting is determined in a calibration procedure which is carried out when a record carrier has been inserted in the information recording device.

Figure 2:
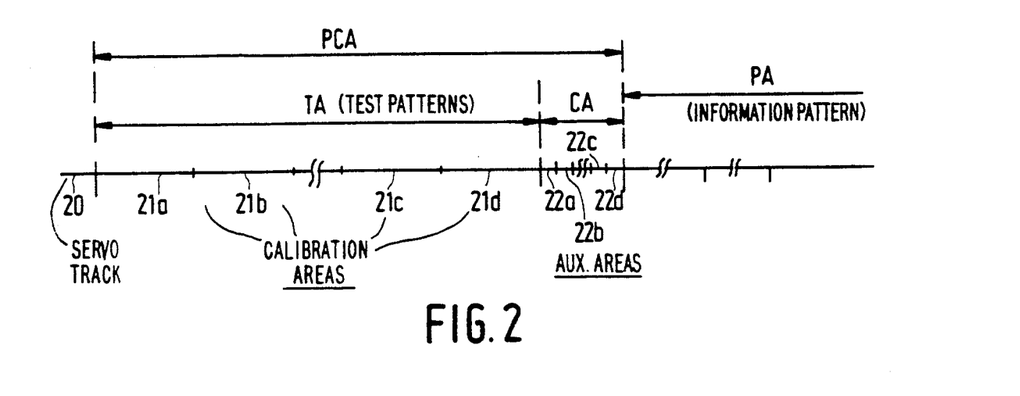
FIGS. 2 and 5 illustrate suitable locations for recording the calibration areas on a record carrier.

For determining the optimum setting, the record carrier has been provided with a number of calibration areas situated at predetermined locations thereon, for example at the beginning of a servo track intended for recording information patterns. FIG. 2 by way of illustration diagrammatically shows a servo track 20 in the form of a straight line. The servo track 20 comprises an area Pa intended for recording information signals. An area TA preceding the area PA is intended for applying test patterns for the purpose of determining the optimum adjustment. The area TA is divided into calibration areas 21a, ..., 21d, each having a length adequate for a sufficient number of test patterns to perform the calibration procedure. At the beginning of each calibration procedure an unused calibration area 21 is selected and subsequently a test pattern is recorded in the selected calibration area 21 for each of several different settings of the adjustment parameter. These test patterns are read, and the optimum adjustment is selected on the basis of the analysis signal Va then generated. The selection of an unused calibration area at the beginning of the calibration procedure can be effected in a number of different ways. For example, it is possible to read the calibration areas and to detect whether a test pattern is present in the calibration area being read. On account of the length of the calibration areas this may take considerable time. Moreover, reading the test patterns may be problematic because in forming the test patterns the servo track may be damaged to such extent that local tracking is no longer possible. When the number of information signals already recorded is indicated in a part of the servo track, the maximum number of calibration areas already used can be determined on the basis thereof, if it is assumed that for recording each information signal only one calibration area is required in order to determine the optimum setting. If for the calibration procedure that calibration area is selected whose sequence number corresponds to the number of recorded information signals incremented by one, it will always be simple to find an unused calibration area. However, care must then be taken that an information signal is actually recorded each time after the optimum setting has been determined. This is in order to guarantee that the calibration area corresponding to one more than the number of recorded information signals specified in the table of contents is actually unused.

The drawbacks of the above selection method can be mitigated by indicating in a separate area on the record carrier which calibration areas are still unused. This is possible, for example, in that after each calibration procedure a signal is recorded which indicates how many calibration areas have already been used. It is also possible to assign an auxiliary area to each calibration area and to form an auxiliary pattern in the associated auxiliary area after the use of the calibration area. In an area CA in FIG. 2 the auxiliary areas assigned to the calibration areas bear the reference numerals 22a, ..., 22d. In this case an unused calibration area can be selected by detecting whether an auxiliary pattern is present in the auxiliary areas. The locations of the calibration areas 21 and the auxiliary areas 22 in the servo track 20 can be specified by addresses, which are recorded for example in the servo track. However, the locations of these areas may also be specified in another manner, for example by arranging these areas at predetermined distances from the center of rotation of a disc-shaped record carrier.

Figure 3:
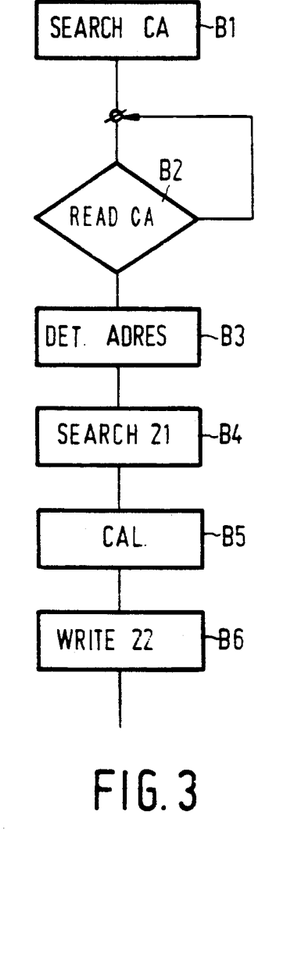
FIGS. 3 and 6 are flow charts of programs performed by control units of the devices.

For the selection of a calibration area the control unit is loaded with a suitable program. FIG. 3 by way of example gives a flow chart of such a program. The program is fetched at the instant at which the optimum setting is to be determined again, for example each time that a record carrier is loaded into an information recording device. The program comprises a step B1 in which the beginning of the area CA is located under control of the control unit 5. Once the area CA is reached, reading of the area CA is started in step B2 and it is checked whether auxiliary patterns are present in the auxiliary areas being read within the area CA. Once an auxiliary area is detected in which no auxiliary pattern has been recorded the address of the beginning of the associated calibration area is derived, in step B3, on the basis of the address of the detected auxiliary area, for example by means of a Table specifying the relationship between the start addresses of the calibration areas and the addresses of the auxiliary areas assigned thereto. Subsequently, in step B4 the calibration area having the address thus determined is located under control of the control unit 5 and in step B5 the calibration procedure is carried out. After step B5, an auxiliary pattern is formed in the auxiliary area assigned to the relevant calibration area in step B6. For recording the auxiliary patterns, the test signal or the information signal Vi applied to the recording device may be used.

It is to be noted that when the test pattern is formed in the calibration area, the servo track may be mutilated to such an extent that the address information following the test patterns can no longer be read in a reliable manner. Therefore, it is preferred to select the calibration areas 21 in such way that always a calibration area is used which is preceded by an area not yet provided with test patterns. This can be achieved simply, for example, by using the last calibration area 21d for the first calibration procedure and by subsequently using each time the calibration area 21 which directly precedes the calibration area 21 last used.

Figure 4:
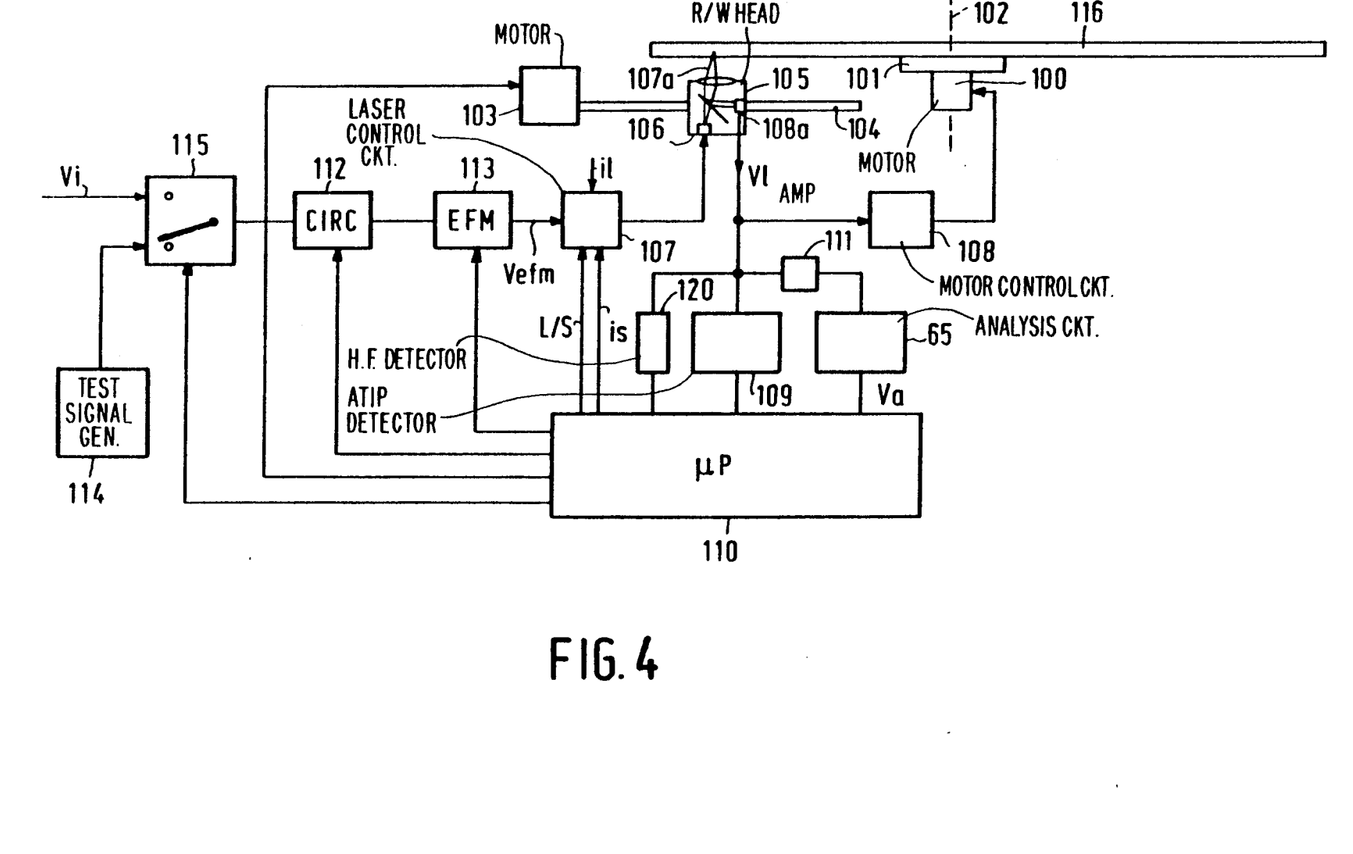

FIG. 4 depicts an illustrative embodiment of an information recording device in more detail. The device shown is of a type by means of which a standard CD signal can be recorded optically on an optical record carrier 116. The optical record carrier 116 may be of a type provided with a radiation-sensitive layer of, for example, a phase-change material or a dye, which layer has been provided with a servo track intended for recording the information patterns.

A record carrier of the above type is described comprehensively inter alia in Dutch Patent Documents NL-A-8800151 now U.S. Pat. No. 4,901,300, NL-A-8900766 and NL-A-8901145, the latter two respectively correspond to U.S. application Ser. Nos. 403,269 (filed Sep. 5, 1989) and 453,545 (filed Dec. 20, 1989). The record carrier described in these Patent Applications has a track modulation in the form of a track-wobble, the frequency being modulated in conformity with an address signal representing addresses in the form of absolute time codes ATIP. An optical read/write head 105 of a customary type is arranged opposite the rotating record carrier 116 and can be moved in a radial direction relative to the record carrier 116 by means of a positioning device, for example in the form of a motor 103 and a spindle 104. If desired, the read/write head 105 can be employed both for recording information patterns and for reading information patterns. For this purpose the read/write head 105 comprises a semiconductor laser for generating a radiation beam 107a whose intensity is variable by means of a driver circuit 107, which is described in detail in, for example, Dutch Patent Document NL-A-8901591 which corresponds to the above-identified related copending U.S. application Ser. No. 07/491 399. In known manner the radiation beam 107a is aimed at the servo track of the record carrier 116. The beam 107a is partly reflected from the record carrier 116, the reflected beam being modulated in conformity with the track wobble and, if an information pattern is present, also in conformity with the information pattern. The reflected beam is directed towards a radiation-sensitive detector 108a, which generates a read signal VI corresponding to the beam modulation. The signal VI comprises a component produced by the track wobble and having a frequency of approximately 22 kHz at the nominal scanning velocity. By means of a motor control circuit 108 for controlling the motor 100 the motor speed is controlled so as to maintain the frequency of the component produced in the read signal VI by the track wobble at substantially 22 kHz. The read signal VI is also applied to a detection circuit 109, which derives the time codes ATIP from the component produced in the read signal VI by the track wobble and applies these codes to a control unit comprising, for example, a microcomputer 110. Moreover, the read signal VI is applied to an amplifier circuit 111 having a high-pass characteristic to reject the signal components produced in the read signal VI by the track wobble. The read signal VI, from which the low-frequency components have thus been removed, is applied to the analysis circuit 85, which indicates the quality of the information pattern being read. An example of the analysis circuit will be described in hereinafter. The analysis signal Va on the output of the analysis circuit 65 is also applied to the microcomputer 110. The recording device further comprises a customary CIRC encoding circuit 112, to which the signal Vi to be recorded can be applied via a switch 115 which is controlled by the microcomputer 110. The CIRC encoding circuit 112 is arranged in series with a conventional EFM modulator 113. The EFM modulator has its output connected to the driver circuit 107. The driver circuit 107 is of a customary controllable type by means of which parameters which can influence the quality of the recorded information pattern can be adjusted. Such a parameter may be, for example, the intensity of the radiation beam during the formation of the information patterns. In the case that the information patterns are formed subsequently with radiation pulses of constant duration, this duration may be an important parameter for influencing the quality of the applied information pattern. In the case of magneto-optical recording, the strength of the magnetic field generated in the record-carrier area scanned by the radiation beam may be an important parameter. For the purpose of generating a test pattern, the recording device 1 may comprise a test signal generator 114, which generates for example a random digital signal or which generates a signal corresponding to the digital signal value zero (digital silence). However, it is to be noted that in principle, the information signal can also be used for the formation of test patterns. The signal generated by the signal generator 114 is applied to the CIRC encoding circuit 112 via the switch 115. The switch 115 is of a customary type which, depending on the control signal received from the control unit 110, transfers either the signal Vi to be recorded or the output signal of the signal generator 114.

Figure 5:
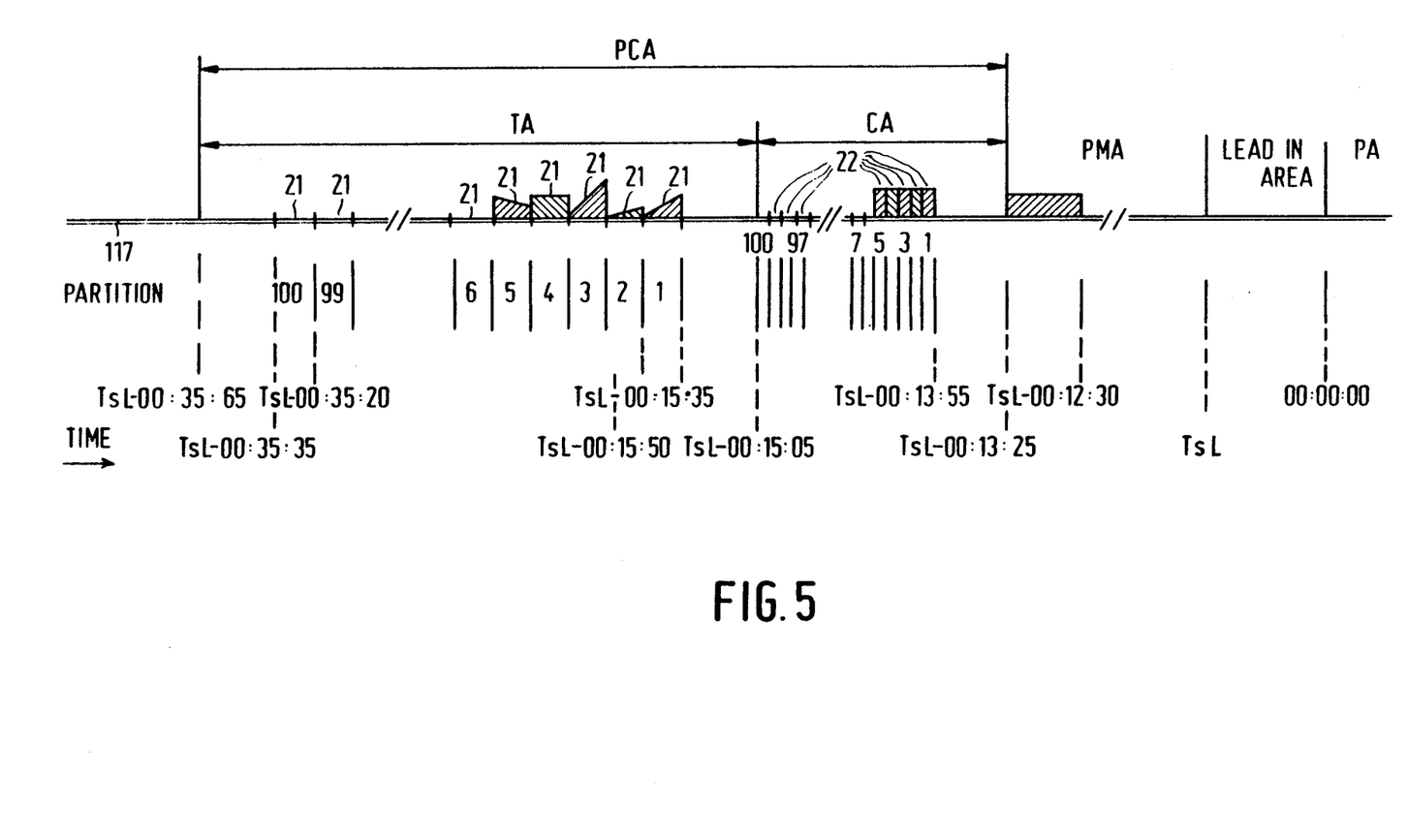

As stated above, the test patterns are preferably recorded at addressable locations on the record carrier 116. If the record carrier 116 is configured in conformity with the aforementioned Netherlands Patent Application NL-A-8900766, on which record carrier the servo track is divided, in this order, into an area (PMA) for recording a temporary table of contents (Temporary TOC), an area (Lead In Area) for the storage of the definitive table of contents (TODC), and a Program Area (PA), the area PCA with the calibration areas is preferably an area which precedes the area (PMA) for recording the temporary table of contents. By way of illustration FIG. 5 shows a layout of the servo track 117. Moreover, FIG. 5 shows the addresses of the various areas indicated by means of absolute time codes ATIP expressed in minutes, second and frames. For example, the absolute time code ATIP for the beginning of the Program Area (PA) is 0.00.00. The absolute time code ATIP at the beginning of the Lead-In Area is marked TsL. The absolute time code ATIP at the beginning of the area PMA is equal to TsL minus 0.13.25, while the beginning of the area TA has an absolute time code equal to TsL minus 0.35.65. Every absolute time code ATIP marks a servo-track portion having a length corresponding to one frame. For each calibration area 21, a number of 15 frames are available and for each auxiliary area 22 one frame is available. If the record carrier is used for recording standard CD signals the available length is amply sufficient to carry out one calibration cycle for every information signal to be recorded. This is because in accordance with the CD-standard the maximum number of different information signals (tacks) is one hundred.

Since the read-out of the ATIP codes in the areas in which already a test-information pattern has been recorded is not always guaranteed, the sequence in which the calibration areas 21 are used is suitably from back to front, i.e. the first calibration area 21 to be used is situated at the end (i.e. near the boundary with the CA area) of the TA area. In this way it is achieved that an area used for determining the optical write intensity is always preceded by a comparatively large area in which no test pattern has been recorded yet. This is an advantage because in a servo-track portion in which the already a test pattern has been recorded the absolute time code ATIP cannot always be read reliably, although this is necessary for determining the beginning of the calibration area 21 to be used. The optimum write intensity can be determined as follows. Before a new information signal is recorded the address of the calibration area for recording a test-information pattern is derived on the basis of the auxiliary areas 22. In the example given in FIG. 5 five calibration areas (having the sequence numbers 1-5) have already been used, which is indicated by the hatched areas. This is represented by auxiliary patterns in the five auxiliary areas having the sequence numbers 1-5. These auxiliary areas are also hatched. The calibration area having the sequence number 6 can then be used for the next calibration cycle, which is indicated by five auxiliary areas 1-5 with auxiliary patterns. After selection of the calibration area, a test pattern is recorded with a number of different write-intensity settings in the selected calibration area. After this the recorded test pattern is read and by means of the analysis signal Va, it is determined in which part of the calibration area the test pattern is optimum. Subsequently, an information pattern is recorded in the associated auxiliary area (having the sequence number 6) with a write intensity corresponding to the write intensity with which the optimum test pattern has been recorded.

Figure 6:
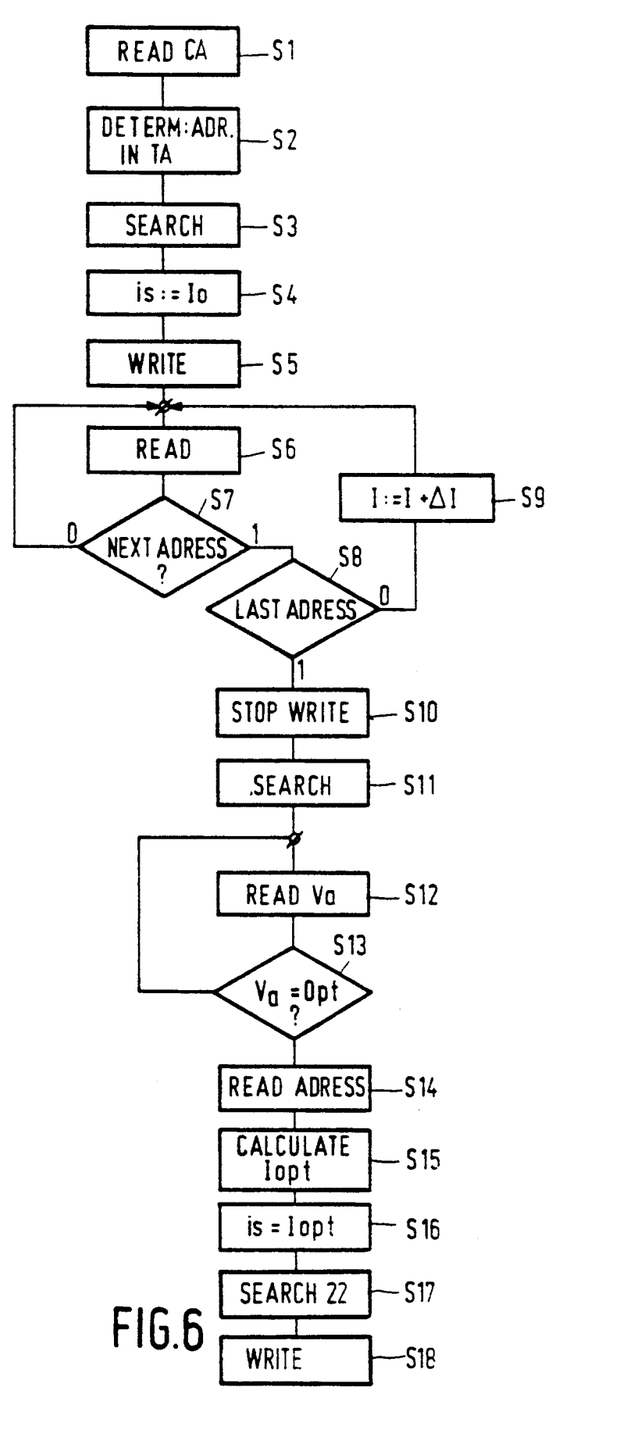

The microcomputer 110 is loaded with a suitable control program for carrying out the calibration cycle. FIG. 6 is a flow chart of an example of such a program. In step S1 of this program the read/write head 105 is positioned opposite the CA auxiliary area on the record carrier under control of the microcomputer 110, addressing being effected by means of the absolute time codes ATIP in the read signal VI detected by the detection circuit 109. In step S2 the address of the calibration area 22 to be used for recording the test pattern is determined on the basis of the information patterns recorded in the auxiliary areas 22. This can be effected simply by detecting whether the reflected beam 107 exhibits a high-frequency modulation during scanning of the auxiliary areas with the beam 107a. Such a high-frequency modulation can be detected by detecting the presence of a high-frequency signal component in the read signal V1. For this purpose the recording device may comprise a high-frequency detector 120 arranged between the read/write head 105 and the microcomputer 110. When a read circuit is employed for recovering recorded information from the read signal V1, the presence of a test pattern can be detected on the basis of the presence of an output signal of the read circuit.

In step S3 the calibration area 21 having the aforesaid address is located under control of the microcomputer 110. Once this area is reached the write intensity Is is set to an initial value Io in Step S4. Preferably, the value of Io for the relevant record carrier is prerecorded on the record carrier in a manner as described in the aforementioned Dutch Patent Document NL-A-8901145, which corresponds to U.S. application Ser. No. 453,545 filed on Dec. 20, 1989. This value can then be read prior to the calibration cycle. Moreover, under control of the microcomputer 110 the signal generator 114 is connected to the CIRC encoding circuit 112 by means of the controllable switch 114, so that an EFM modulated test signal determined by the output signal of the signal generator is generated by the EFM modulator 113. Finally, in step S5 the control signal L/S sets the driver circuit 107 in such a way that the write intensity Is of the beam 107a is switched between the initial value Io and an intensity I1 in conformity with the EFM modulated signal Vefm on the output of the EFM modulator 113, which results in a test pattern corresponding to the EFM signal being recorded. In step S6 the absolute time code ATIP detected by the detection circuit 109 is read out by the computer 110. In step S7 it is ascertained whether this absolute time code has changed relative to the previous read-out. If this is not the case step S6 is repeated. If it has changed, it is determined in step S8 whether the absolute time code being read indicates the end of the calibration area. If this is not the case step S9 is carried out, in which the write intensity Is is incremented by a small step $_\Delta$I, after which the program proceeds with step S6. If in step S8 it is found that the end of the calibration area 21 has been reached, step S10 is performed in which the control L/S sets the driver circuit 107 in such a way that the intensity of the beam 1107 is maintained constant at the level I1. In step S11 the beginning of the said calibration area 21 is located and read again. In step S12 the analysis signal Va is read by the microcomputer 110. In step S13 it is checked whether the value of the analysis signal Va corresponds to the optimum quality of the test pattern. If this is not the case the program proceeds with step S12. In the other case the absolute time code detected by the detection circuit 109 is read out in step S14. Subsequently, in step S15 the optimum write intensity corresponding to the absolute time code read in step S14 is computed. This is possible, for example, by determining the difference between the absolute time code last read and the time code corresponding to the beginning of the calibration area. By means of this difference it is possible to determine by how many steps $_\Delta$I the initial value Io has been incremented before the absolute time code ATIP last read was reached during recording of the test-information pattern. This number of steps and the initial value Io define the optimum write energy Iopt. Subsequently, in step S16 the write intensity Is is set to the optimum value Iopt.

In step S17 the auxiliary area 22 is located which is associated with the calibration area used. In step S18, once this area has been reached, an auxiliary pattern is formed in this auxiliary area 22.

During the formation of test patterns in the calibration procedure described above this is initially effected with a low write intensity, which is subsequently incremented in steps. This means that it is possible to guarantee that the address information at the beginning of the calibration area can always be read because the address information will not be mutilated by the test patterns formed at low write intensities.

Figure 7:
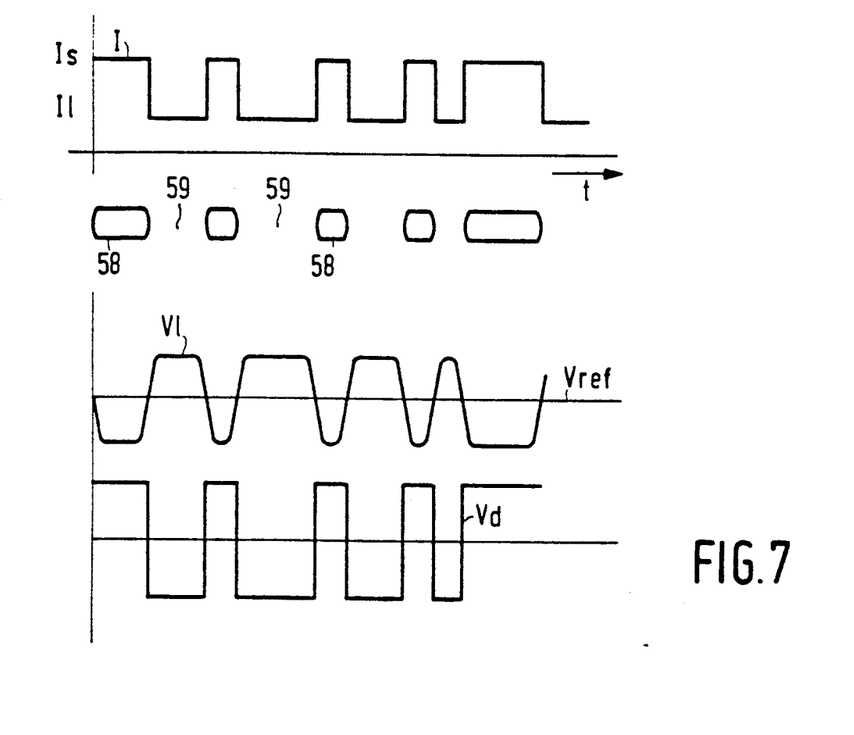
FIGS. 7, 8a–c and 9a–c illustrate suitable methods of determining the optimum adjustment.

Suitable methods of determining the optimum write intensity will be described by way of example. An optically readable record carrier is provided with an information pattern comprising effects having varying reflection properties by scanning the record carrier with a radiation beam whose intensity I is switched between a low level Ii for which there are no changes in reflection and a high write level Is which produces a change in reflection in the scanned part of the record carrier. An example of such an intensity variation I and the associated pattern of effects 58 having changed reflection properties and intermediate areas 59 having unchanged properties is given in FIG. 7. The information pattern of effects 58 and intermediate areas 59 can be read by scanning the pattern with a read beam of a constant intensity, which is low enough to preclude a detectable change in optical properties. During the scanning process the read beam reflected from the record carrier is modulated in conformity with the information pattern being scanned. The modulation of the read beam can be detected in a customary manner by means of a radiation-sensitive detector, which generates a read signal V1 which is indicative of the beam modulation. The read signal V1 is also shown in FIG. 7. The read signal V1 is reconverted into a bivalent signal by comparison of the read signal with a reference level Vref. For a reliable conversion it is desirable that the points where the read signal V1 intersects the reference level are well-defined, in other words, the "jitter" in the read signal V1 should be minimal. As is known, jitter of the read signal V1 in optical recording is minimal if the information pattern is symmetrical, i.e. if the average length of the effects 58 is equal to the average length of the intermediate areas 59. The problem which then arises is that the length of the effects 58 strongly depends on the write intensity Is. If the write intensity is too high the effects 58 will be too long and if the write intensity is too low the effects 58 will be too short. Therefore, an accurate adjustment of the write intensity is required.

In a possible method of determining the optimum write intensity, test patterns can be recorded with the aid of a pulse-shaped signal having a 50% duty cycle at different write intensities, after which the recorded test pattern can be read. The optimum setting can then be selected by determining for which setting the second harmonic distortion of the read signal V1 is minimal.

Figure 8A:
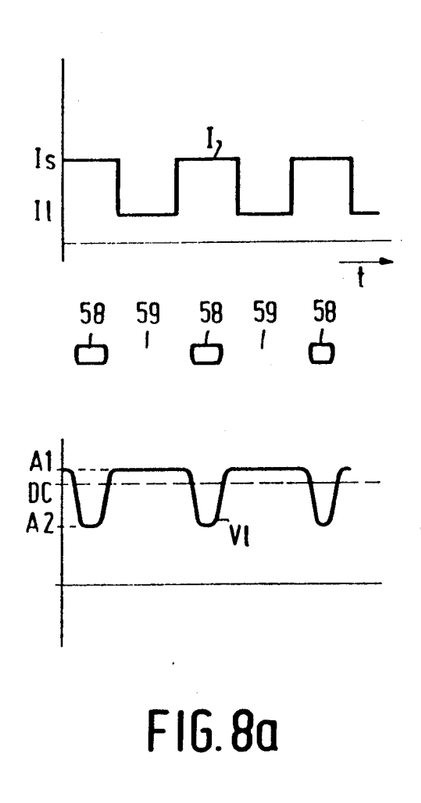
Figure 8B:
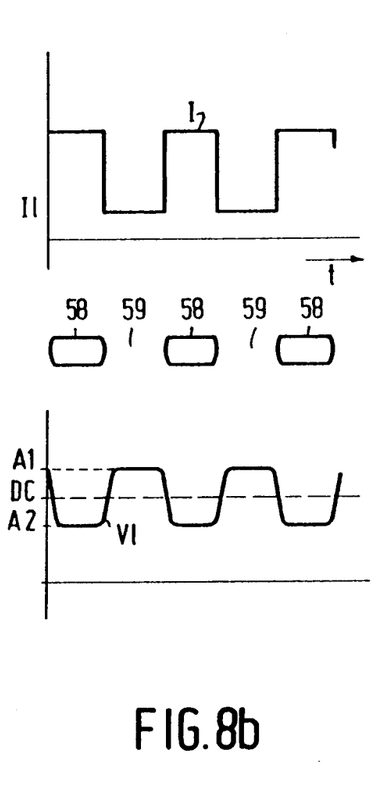
Figure 8C:
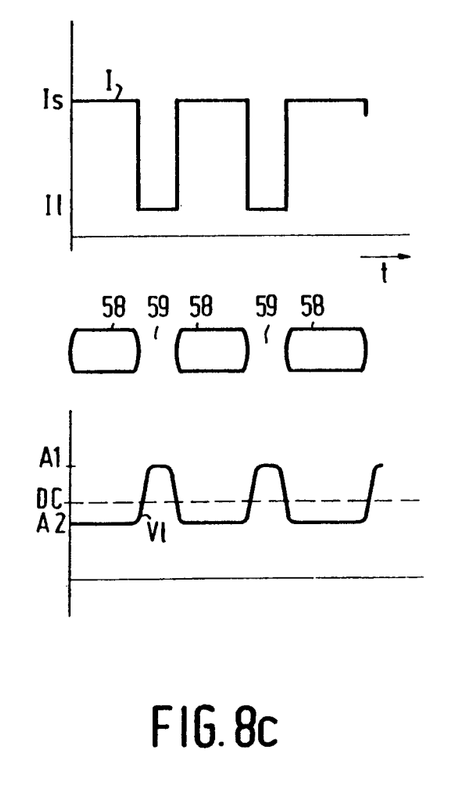

Another method of determining the optimum write intensity, which is also described in the above-cited copending application Ser. No. 07/491,399, will be described in more detail with reference to FIG. 8. FIGS. 8a, 8b and 8c show the intensity variation I, the corresponding information pattern of effects 58 and intermediate areas 59, and the read signal V1 in the case that the write intensity Is is too low, optimum and too high respectively.

In FIG. 8 the read signals V1 vary between a maximum level A1 and a minimum level A2. The level DC represents the value of the d.c. level in the read signal V1. As will be apparent from FIG. 6, the d.c. level DC of the read signal V1 is substantially centered between the levels A1 and A2 when the write intensity has the optimum value. If the write intensity is too low the d.c. level DC will be situated above the middle between the levels A1 and A2, while in the case that the write level is too high the d.c. level DC will be situated below the middle between the levels A1 and A2. Thus, an optimum write intensity setting can be obtained by adjusting the write intensity Is to a value for which the d.c. level DC is situated substantially in the middle between the levels A1 and A2.

Figure 9A:
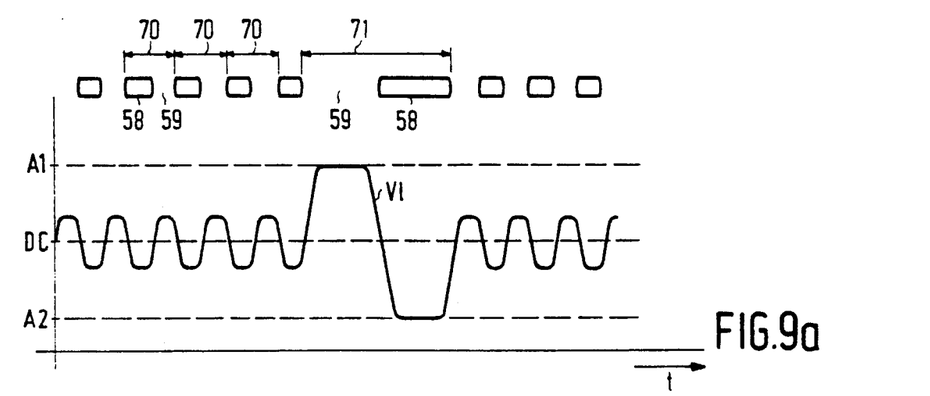

An improvement of the above method of determining the optimum intensity, which is also disclosed in the aforementioned copending application, will be described with reference to FIG. 9a. In accordance with this method an information pattern is recorded for the purpose of determining the optimum intensity, which pattern comprises a plurality of sub-patterns 70 each comprising a short effect 58 and a short intermediate are 59, recorded by means of a write signal having a 50% duty cycle. The information pattern further comprises a second sub-pattern 71 comprising a comparatively long effect 58 and a comparatively long intermediate area 59, also recorded with the aid of a write signal having a 50% duty cycle. The number of sub-patterns 70 is selected to be substantially larger than the number of sub-patterns 71. FIG. 9a further shows the read signal V1 obtained in the case of reading with the aid of an optical read device.

The dimensions of the sub-patterns 70 are selected in such a way that the amplitude of the signal components in the read signal V1 corresponding to these sub-patterns 70 is substantially smaller than the amplitude of the signal components corresponding to the sub-patterns 71. This can be achieved by selecting the dimensions of the sub-patterns 70 in such a way that only the 1st harmonic of this pattern is situated below the optical cut-off frequency of the optical scanning device. The dimensions of the sub-pattern 71 are selected in such a way that at least the 1st and the 2nd harmonic of this pattern are situated below this optical cut off frequency. The d.c. level DC in the read signal V1 is dictated mainly by the signal components corresponding to the sub-patterns 70. The difference between the maximum value A1 and the minimum value A2 of the read signal V1 is dictated exclusively by the value corresponding to the sub-pattern 71. As a change in write power Is has a substantially greater influence on the ratio between the lengths òf the effects 58 and the intermediate areas 59 of the sub-patterns 70 than on the ratio between these lengths for the sub-patterns 71, the d.c. level DC in the case of the method illustrated in FIG. 9a will also be far more susceptible to write level variations than in the case of the method illustrated in FIG. 8, where the amplitude of the read signal V1 is the same for all the sub-patterns occurring in the information pattern. All this means that the optimum write power can be determined far more accurately by means of the method illustrated in FIG. 9a.

Figure 9B:
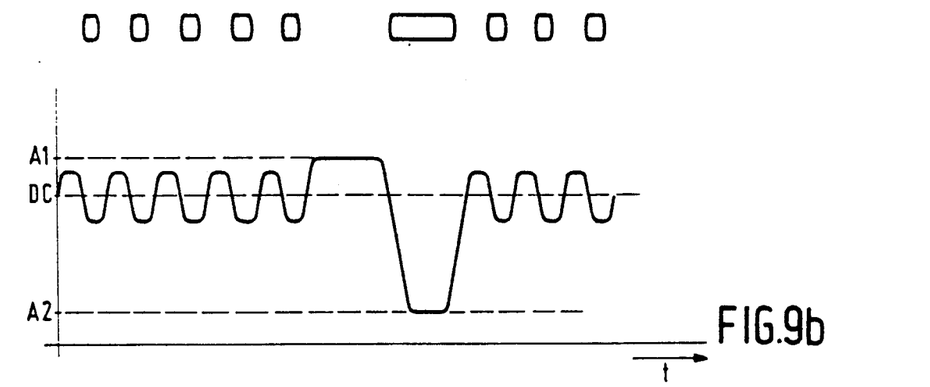
Figure 9C:
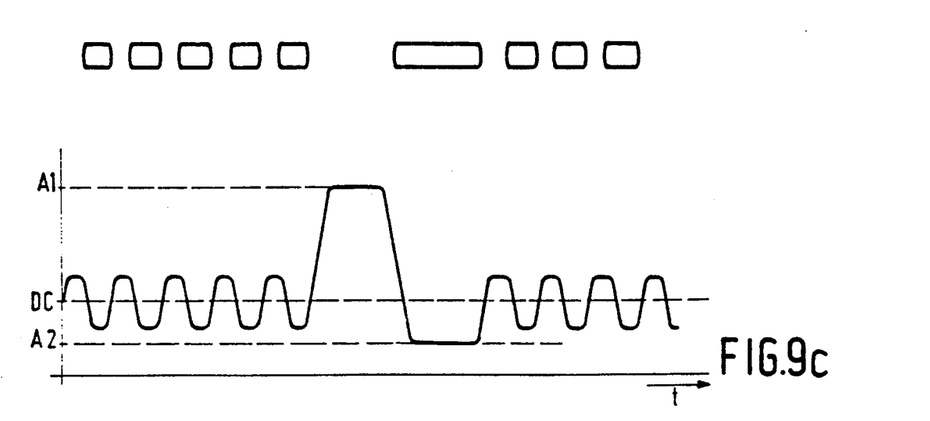

In addition to the information pattern shown in FIG. 9a, which has been recorded with an optimum write intensity, similar information patterns are shown in FIGS. 9b and 9c, which have been recorded at a write level which is too low and which is too high respectively. As will be apparent therefrom, the DC level in the case of the optimum write intensity is again substantially centered between the maximum signal value (A1) and the minimum signal value (A2) in the signal V1, while in the case of a write level which is too low or too high the DC level is situated above and below the center respectively. The illustrated information pattern is only one of the possible information patterns comprising a comparatively large number of sub-patterns comprising short effects and intermediate areas and a comparatively small number of sub-patterns comprising long effects and intermediate areas. A sub-pattern which is also very suitable is a pattern corresponding to an EFM signal in conformity with the CD standard. Such a pattern comprises areas of a length corresponding to at least 3 bits (I3 effect) and at the most 11 bits (I11 effect). Approximately one third of all the effects in such a EFM pattern are I3 effects, whereas only 4% of all the effects are I11 effects. The dimensions of the I3 effects are such that only the fundamental of these effects is situated below the optical cut-off frequency of the optical read system. Of the I11 effects at least the 1st, the 2nd and the 3rd harmonic are situated below the optical cut-off frequency.

Figure 10:
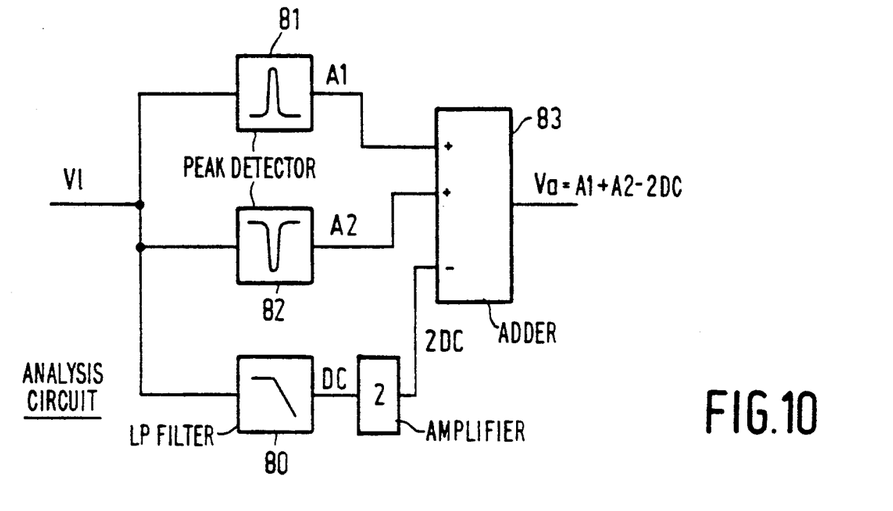
FIG. 10 shows an example of an analysis circuit for use in the device shown in FIG. 4.

FIG. 10 shows an example of the analysis circuit in FIG. 4 by means of which an analysis signal Va can be derived from the read signal V1 to indicate the extent to which the d.c. level DC deviates from the level corresponding to the optimum write intensity. The analysis circuit in FIG. 10 is as disclosed in the aforementioned copending U.S. application, and comprises a low-pass filter 80 for determining the DC level of the read signal V1. It further comprises a positive-peak detector 81 for determining the maximum value A1 of the read signal V1 and a negative-peak detector 82 for determining the minimum value A2 of the read signal V1. The output signals of the peak detectors 81 and 82 are applied to non-inverting inputs of an adder circuit 83, while the output signal of the low-pass filter 80, after amplification to twice its value, is applied to an inverting input of the adder circuit 83, so that the output signal of the adder circuit, which signal constitutes the analysis signal Va, complies with $Va = A1 + A2 - 2DC$ and consequently indicates the extent to which the d.c. level DC deviates from the mean value of the maximum signal value A1 and the minimum signal value A2.

For other suitable examples of analysis circuits reference is made to Dutch Patent Document NL-A-8901591 which corresponds to the aforementioned copending U.S. application. If the second harmonic distortion in the read signal is employed as a measure of the quality of the applied pattern, the analysis circuit may comprise a customary 2nd harmonic detector.

It is to be noted that the invention is not limited to optical recording devices but may also be employed in other recording devices, such as for example magnetic recording devices or devices in which information is recorded by means of an electron beam. Although the invention can also be used for record carriers of a type which can be overwritten, the invention is particularly suitable for use in conjunction with record carriers of the write-once type.

I claim:

1. A method of successively recording a plurality of information signals on a record carrier by forming successive information patterns thereon respectively corresponding to the respective information signals, in which method at least one record-carrier-dependent recording parameter which influences the quality of the recorded information patterns is adjusted to achieve an optimum quality of such patterns;

the record carrier having thereon a series of calibration areas and a series of auxiliary areas separate from and respectively corresponding to the respective calibration areas; said method comprising, for recording of an information signal, the steps of:

determining from said auxiliary areas those of said calibration areas which have not been previously used for recording of test patterns therein;

selecting one of the so-determined previously unused calibration areas;

recording a plurality of test patterns in the selected calibration area, each at a different setting of said recording parameter;

determining an optimum setting of said recording parameter according to a predetermined criterion of optimum quality of the recorded test patterns;

adjusting said recording parameter in conformity wit the determined optimum setting thereof during recording of said information signal; and recording an auxiliary pattern in the auxiliary area corresponding to said selected calibration area, such auxiliary pattern being recorded at said determined optimum setting of said recording parameter.

2. A method ad claimed is claim 1, wherein the selected calibration area is that corresponding to the last of said series of auxiliary areas which do not already have auxiliary patterns recorded therein.

3. A method ad claimed is claim 2, wherein said auxiliary areas have dimensions that are smaller than the dimensions of said calibration areas, whereby the calibration area to be selected can be located more rapidly on the basis of said auxiliary areas than on the basis of said calibration areas.

4. A method ad claimed is claim 1, wherein the record carrier has pre-recorded addresses thereon and the locations of the respective calibration areas and corresponding auxiliary areas are specified by the relevant addresses of such areas.

5. A method ad claimed is claim 1, wherein the record carrier has a capacity for recording of a limited number of information signals, and the number of calibration areas is at least equal to the number of information signals which can be recorded.

6. An information recording device for successively recording a plurality of information signals on a record carrier, the record carrier having thereon a series of calibration areas and a series of auxiliary areas separate from and respectively corresponding to the respective calibration areas; said device comprising:

write means for recording an information pattern on the record carrier corresponding to a respective information signal, said write means having a record-carrier-dependent recording parameter which influences the quality of the recorded information pattern;

selecting means for selecting a calibration area from among those of said series of calibration areas which have not bee previously selected for recording of information signals;

means for controlling said write means to record a plurality of test patterns in the selected calibration area, each at a different setting of said recording parameter;

means for determining an optimum setting of said recording parameter according to a predetermined optimum quality of the recorded test patterns; and means for adjusting said recording parameter in conformity with said determined optimum setting thereof during recording of said information signal;

said control means being adapted to further control said write means following said adjustment of said recording parameter thereof so as to record an auxiliary pattern in the auxiliary area corresponding to said selected calibration area.

7. An information recording device as claimed in claim 6, wherein said selecting means is adapted to located the selected calibration area by determining the last of said series of auxiliary areas which do not already have auxiliary patterns recorded therein; whereby said selected calibration area is preceded by as yet unrecorded calibration area.

8. An information recording device as claimed in claim 6, wherein the record carrier has pre-recorded addresses thereon and said selecting means is adapted to locate respective calibration areas and auxiliary areas from the relevant addresses of such areas.

* * * * *

UNITED STATES PATENT AND TRADEMARK OFFICE
CERTIFICATE OF CORRECTION

PATENT NO. : 5,226,027
DATED : July 6, 1993
INVENTOR(S) : Johannes L. Bakx It is certified that error appears in the above-identified patent and that said Letters Patent is hereby corrected as shown below:

Column 13:

Claim 1, lines 6-10, these lines should commence on line 5, after the simicolon ";", as a continuation of the first paragraph.

Column 13:

Claims 2, 3, 4 and 5, line 1, change "ad" to --as--; change "is" to --in--.

Column 14:

Claim 7, line 7, change "area" to --areas--.

Signed and Sealed this

Fifteenth Day of March, 1994

*Attest:*

BRUCE LEHMAN

*Attesting Officer*     *Commissioner of Patents and Trademarks*